United States Patent
Patil et al.

(10) Patent No.: US 11,417,433 B2
(45) Date of Patent: Aug. 16, 2022

(54) ARCHITECTURE FOR SECURE IOT INTERACTIONS

(71) Applicant: Visa International Service Association, San Francisco, CA (US)

(72) Inventors: Ajit Vilasrao Patil, Singapore (SG); Balkrishna Pangam, Singapore (SG); Yew Kuann Cheng, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 15/734,943

(22) PCT Filed: Jun. 13, 2018

(86) PCT No.: PCT/US2018/037233
§ 371 (c)(1),
(2) Date: Dec. 3, 2020

(87) PCT Pub. No.: WO2019/240783
PCT Pub. Date: Dec. 19, 2019

(65) Prior Publication Data
US 2021/0233672 A1  Jul. 29, 2021

(51) Int. Cl.
*G06F 15/173* (2006.01)
*G16Y 30/10* (2020.01)
*G16Y 40/35* (2020.01)
*H04L 9/06* (2006.01)
*H04L 9/32* (2006.01)

(52) U.S. Cl.
CPC .............. *G16Y 30/10* (2020.01); *G16Y 40/35* (2020.01); *H04L 9/0643* (2013.01); *H04L 9/3239* (2013.01); *H04L 2209/38* (2013.01)

(58) Field of Classification Search
CPC . H04L 9/0643; H04L 9/3239; H04L 2209/38; G16Y 30/10; G16Y 40/35
See application file for complete search history.

(56) References Cited

U.S. PATENT DOCUMENTS

| | | | |
|---|---|---|---|
| 10,721,274 B1* | 7/2020 | Prasad | H04L 41/145 |
| 2013/0332033 A1 | 12/2013 | Debouk et al. | |
| 2016/0261690 A1* | 9/2016 | Ford | H04L 41/0806 |
| 2017/0111373 A1 | 4/2017 | Morton et al. | |
| 2017/0230375 A1* | 8/2017 | Kurian | H04L 63/102 |
| 2017/0243222 A1* | 8/2017 | Balasubramanian | G06Q 20/4014 |
| 2017/0244721 A1* | 8/2017 | Kurian | H04L 63/105 |
| 2017/0302663 A1* | 10/2017 | Nainar | H04W 4/70 |
| 2017/0323392 A1 | 11/2017 | Kasper et al. | |
| 2017/0352245 A1 | 12/2017 | Maher et al. | |
| 2018/0137512 A1* | 5/2018 | Georgiadis | H04L 9/3236 |

(Continued)

OTHER PUBLICATIONS

Application No. PCT/US2018/037233, International Search Report and Written Opinion, dated Mar. 4, 2019, 12 pages.

*Primary Examiner* — Razu A Miah
(74) *Attorney, Agent, or Firm* — Kilpatrick Townsend & Stockton LLP

(57) ABSTRACT

A method and system corresponding to a secure architecture for executing Internet of Things (IoT) device actions using blockchains is described. A network of IoT devices can manage two blockchains. The first blockchain can store operational data, collected from the IoT devices and written to the first blockchain. A second blockchain can be used to store action data.

20 Claims, 10 Drawing Sheets

(56) References Cited

U.S. PATENT DOCUMENTS

| | | | |
|---|---|---|---|
| 2018/0189449 A1* | 7/2018 | Karumba | G16H 40/67 |
| 2018/0330349 A1* | 11/2018 | Uhr | H04L 9/0637 |
| 2018/0337820 A1* | 11/2018 | Chen | H04L 67/10 |
| 2019/0213182 A1* | 7/2019 | Rapanen | H04L 9/0637 |
| 2019/0297101 A1* | 9/2019 | Dhakshinamoorthy | H04L 63/1425 |
| 2019/0379664 A1* | 12/2019 | Suthar | H04L 63/0892 |
| 2020/0336542 A1* | 10/2020 | Wang | H04L 9/3239 |

* cited by examiner

ARCHITECTURE FOR SECURE IOT INTERACTIONS

CROSS REFERENCE TO RELATED APPLICATIONS

This application is a National Stage of International Application No. PCT/US2018/037233, filed on Jun. 13, 2018, which is herein incorporated by reference in its entirety.

BACKGROUND

The Internet of Things (IoT) is an ever-expanding network of physical devices embedded with electronics, software, sensors, actuators, and means of communicating with other devices in a network. In the past, networks such as the Internet allowed traditional computing devices (e.g., laptops, desktops, webservers, etc.) to communicate with one another. The IoT expands the Internet to include consumer appliances such as toasters and refrigerators, vehicles such as smart cars, and industrial equipment such as wind turbines and band-saw machines.

IoT devices offer a number of advantages over their non-IoT counterparts. For example, a traditional wind turbine has to be periodically inspected to determine if maintenance is necessary, but an IoT wind turbine can transmit maintenance data to a maintenance crew when maintenance is needed. However, IoT devices also present a number of disadvantages over non-IoT devices, particularly relating to security.

Specifically, IoT devices offer new avenues of attack for hackers. Like other Internet connected devices such as computers, IoT devices can be compromised by hackers over the Internet. In industrial applications, this can have serious consequences, such as a hacker causing a motor on an Internet connected conveyor belt to run at dangerous speeds, potentially injuring workers on a factory floor. As another example, IoT devices can be compromised and user to perform Distributed Denial of Service (DDoS) attacks on other Internet connected systems.

In a more specific illustration, a washing machine that is interconnected to the Internet could be hacked so that it orders more supplies (e.g., detergent) than it needs. The hacker could steal such supplies upon delivery, and the owner of the washing machine may have a difficult time determining that the washing machine was hacked. Thus, improvements relating to the security of interconnected networks of devices are needed.

Embodiments of the invention solve these problems and other problems, individually and collectively.

SUMMARY

Embodiments of the invention include methods and systems that can ensure that actions performed by devices in a device network are legitimate. Embodiments of the invention can also help ensure that devices in the device network are not compromised.

One embodiment of the invention includes a method comprising: receiving, by a node in a network of nodes, operational data of nodes in the network of nodes, wherein the node stores a first blockchain and a second blockchain; writing, by the node, the received operational data and optionally operational data of the node to the first blockchain; determining, by the node or another node in the network an action to be performed for the node or the another node; determining, by the node and using the operational data in the first blockchain and/or actions on the second blockchain, if the action to be performed is valid; and writing, by the node, data relating to the action to be performed on the second blockchain.

Another embodiment of the invention includes a node in a network of devices comprising: a processor; and a non-transitory computer readable medium coupled to the processor. The non-transitory computer readable medium comprises code executable by the processor for implementing a method comprising: receiving, by a node in a network of nodes, operational data of nodes in the network of nodes, wherein the node stores a first blockchain and a second blockchain; writing, by the node, the received operational data and optionally operational data of the node to the first blockchain; determining, by the node or another node in the network, an action to be performed for the node or the another node; determining, by the node and using the operational data in the first blockchain and/or actions on the second blockchain, if the action to be performed is valid; and writing, by the node, data relating to the action to be performed on the second blockchain.

Another embodiment of the invention includes a method comprising: transmitting, by a first device in a network of devices, first operational data to an endpoint device, wherein the endpoint device receives the first operational data from the first device and second operational data from one or more second devices in the network of devices and writes the first operational data and the second operational data to a first blockchain managed by the network of devices; retrieving, by the first device, the first operational data and the second operational data from the first blockchain; determining, by the first device, one or more first device actions; generating, by the first device, a first message comprising the one or more first device actions; broadcasting, by the first device, the first message to the devices in the network of devices, wherein the one or more second devices verify the one or more first device actions; receiving, by the first device, from the one or more second devices, one or more second messages comprising one or more second device actions; verifying, by the first device, that the one or more second device actions are valid based on the first operational data and second operational data; writing, by the first device, the one or more first device actions to a second blockchain managed by the network of devices; reading, by the first device, one or more device actions corresponding to the first device from the second blockchain; and executing, by the first device, the one or more device actions corresponding to the first device.

Another embodiment is directed to a first device in a network of devices comprising: a processor; and a non-transitory computer readable medium coupled to the processor, the non-transitory computer readable medium comprising code executable by the processor for implementing the above-noted method.

DETAILED DESCRIPTION

Figure 1:
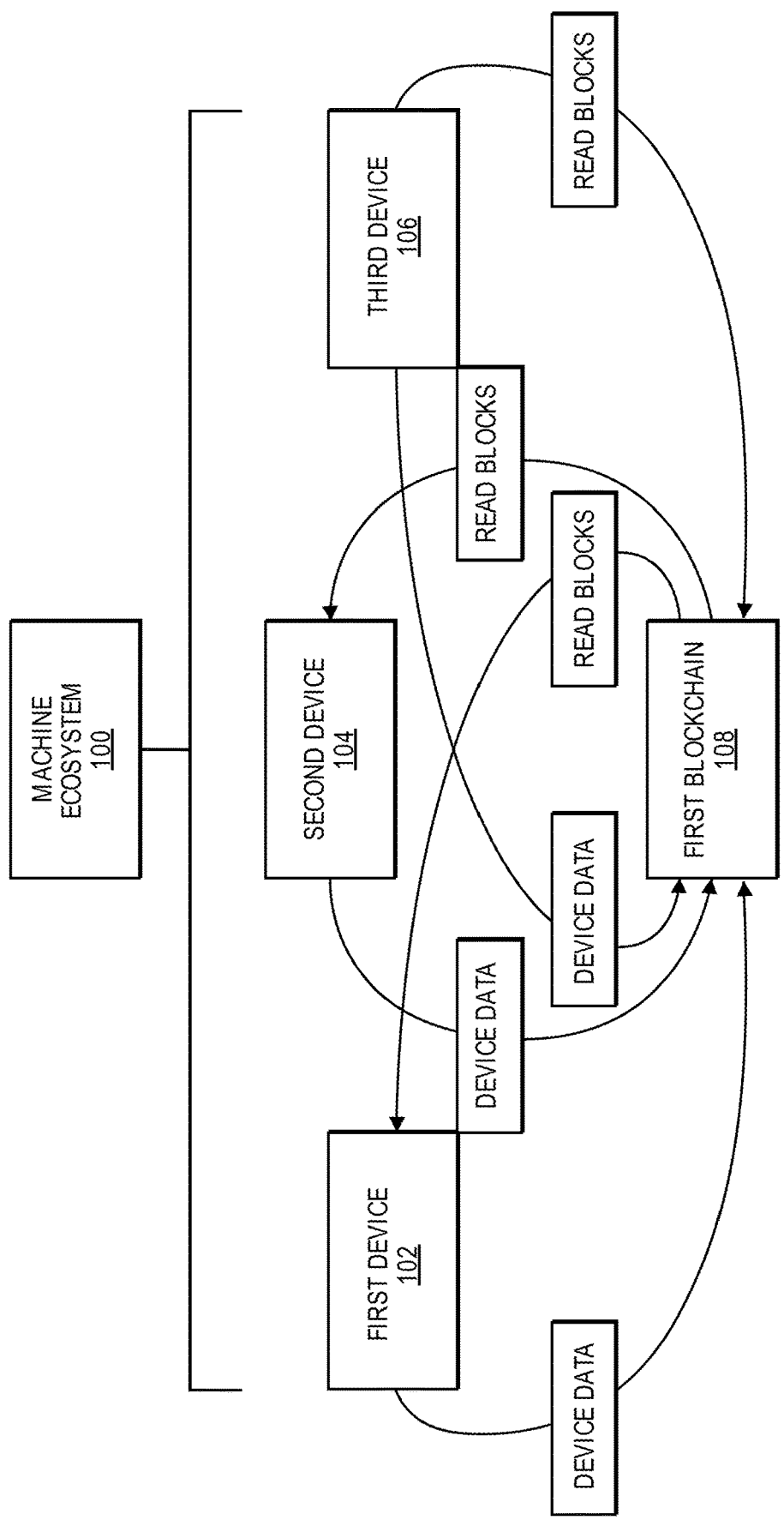
FIG. 1 shows a block diagram of an exemplary IoT device ecosystem reading from and writing to a first blockchain according to some embodiments.

Prior to discussing specific embodiments of the invention, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "node" can include a point within a network. A node can correspond with a device such as an IoT device.

The term "verification" and its derivatives may include to a process that utilizes information to determine whether an underlying subject is valid under a given set of circumstances. Verification may include any comparison of information to ensure some data or information is correct, valid, accurate, legitimate, and/or in good standing. In some embodiments, verification may involve evaluating a digital signature or digital certificate, in order to determine if the signature, and by extension the signed data, is legitimate.

A "cryptographic key" may include any string of bits used by a cryptographic algorithm to transform plain text into cipher text or vice versa. Cryptographic keys may include symmetric and asymmetric keys. A cryptographic key may be used to sign data or proposed data and/or verify signed data. For example, a proposed device action may be signed using a private key. The signed proposed device action may then be verified using a public key that corresponds to the private key.

A "private key" is a type of cryptographic key that is kept secret by a party. A private key may be used to sign data such that it may be verified using the blockchain network.

A "public key" may be a type of cryptographic key that is distributed to, or available to some entity over than a party holding a corresponding private key. In some embodiments, the key may be publically available, while in other cases it may be distributed to nodes in a network, but the network itself may not be accessible to the general public. A public key may be made available to nodes of a blockchain network and/or resource providers so that signed data associated with the public key may be verified by the nodes.

A "digital certificate" may refer to an electronic document used to prove ownership of a public key. A digital certificate may include information about the public key, information about the identity of its owner, and the digital signature of a trusted entity that has verified the certificate's contents (e.g., an issuer or certificate authority). Digital certificates may conform to standards such as X.509, a standard that defines the format of public key certificates.

A "digital signature" may refer to a code or method used to present the authenticity of a digital message or document. Further, a digital signature may be used to verify that the contents of a document have not been tampered with. A private key may be used to encrypt some block of data corresponding to a digital message or document. Other parties can verify the digital signature using the public key. For example, a first party can generate the cryptographic hash of a document, sign the hash with the private key, append the hash to the document, and transmit the document to a second party. The second party can verify the signature by generating their own hash, verifying the hash with the public key, and comparing the two hashes. Digital signatures can be used to indicate the source of IoT operational data or device actions. Further, digital signatures may be used in endorsement-based consensus algorithm or policy, where digital signatures are used to indicate that operational data or devices actions have been endorsed by an IoT device.

An "Internet of Things device" (IoT device) may refer to a device with embedded electronics enabling the device to connect and exchange data with other devices, including IoT devices as well as computing devices (e.g., laptop computers, desktop computers, webservers, etc.). These embedded electronics may include processors, memories, antenna, communications interfaces, etc. IoT devices may include consumer appliances, such as toasters, blenders, refrigerators, thermostats, and the like. These devices may be connected to and exchange data with devices such as a user's smartphone, so the user can control the operation of these devices. IoT devices may additionally include vehicles such as internet connected cars and internet connected industrial manufacturing equipment.

"Operational data" may include data related to an operation of a device. Operational data may also include operational state data indicating a state of the device (e.g., on, off, sleep, cool down, temperature, etc.), resource consumption data (e.g., electricity, water or data consumption or usage), sensor data (e.g., data from sensors in a device), etc. Operational data may also include timestamps associated with when date relating to a state of a device, resources consumed, or when data is collected.

An "action" may include an activity performed by a device. Examples of actions include moving actuators in a device, initiating communications, etc.

An "endpoint device" may include a device that may server as a central authority for a network, and in some embodiments, may be located at the edge of a network. An endpoint device can be at the edge of a network of IoT devices. An endpoint device can be implemented as an IoT device, dedicated server or cloud server. An endpoint device can communicate with other devices in network, and can act as a node in a blockchain network. The endpoint device may be more secure than other devices in the device network. In this regard, it may include one or more secure elements or hardware security modules.

A "blockchain" may include a distributed database that maintains a continuously-growing list of records secured from tampering and revision. Each block in the blockchain can also contain a timestamp and a link to a previous block. Records in a blockchain may be stored as a series of "blocks."

A "smart contract" (also referred to as "chaincode") may include code or functions that can be used to interact with a blockchain. Smart contracts can be activated or "invoked" by a device or application in order to query or update a blockchain. Smart contracts can contain functions or conditional logic used as part of querying or updating the blockchain. Further, smart contracts themselves can be written to the blockchain. Smart contracts may be used by nodes in a blockchain network (e.g., IoT devices) to achieve consensus or enact an endorsement policy.

"Consensus" may include an agreement between entities. In the context of blockchains, consensus may refer to the agreement on what data will be added to the blockchain by nodes in the blockchain network. Consensus may be achieved by a consensus algorithm, a procedure that results in agreement on the data value to be written to the blockchain. An example consensus algorithm is voting, where nodes vote on the data to be added to the blockchain and accept the data with the highest number of votes. Another example is proof of work, where nodes compete to solve a computationally difficult problem and accept the data corresponding to the node that successfully solves the problem. Proof-of-stake is a consensus algorithm where nodes with the most stake in the blockchain network have the most influence over what data is written to the blockchain. Yet another example is endorsement based consensus, where nodes agree to write data provided it has been endorsed by enough endorsing nodes.

An "endorsement" may include a declaration of approval or support of something. In the context of a blockchain, proposed data may be endorsed by one or more nodes in the blockchain network. A node may endorse data by signing the proposed data using its private key, such that other nodes can verify the endorsement using a public key. An endorsement may be given based on an "endorsement policy" that defines the conditions where proposed data can be endorsed. As an example, for a blockchain comprising blocks of records corresponding to electricity usage and electricity cost, an endorsement policy may involve a node verifying that for a proposed usage-cost pair, the cost correctly corresponds to the usage. If the cost corresponds to the usage, the node may endorse the proposed data by signing it, otherwise, the node may refuse to sign the proposed data.

An "interaction" may include a reciprocal action, effect or influence. For example, an interaction could be an exchange or transaction between two or more parties.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

An "acquiring entity" can be an entity that can come into possession of something. An acquiring entity may be a business entity (e.g., a commercial bank) that has a business relationship with a particular resource provider, merchant, or other entity. An acquiring entity may operate an acquiring entity computer, which may be referred to as a "transport computer."

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer."

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "electronic identifier" may be any suitable string of characters or symbols used to identify an entity (e.g., a person or IoT device). An electronic identifier corresponding to an IoT device may be referred to as a device identifier. In some embodiments, the electronic identifier may be a value calculated by hashing one or more input values available to multiple entities. In this way, the electronic identifier may be independently generated by any entity that has the prerequisite information. In order to prevent an electronic record from being accessed by an unauthorized party, an electronic identifier may be hashed or encrypted. For example, an electronic identifier may comprise a combination of a country code, customer name, date of birth, and last four digits of a social security number such as SHA256(USA*JOHN SMITH*19700101*1234). Hashing this value may result in a seemingly random string of characters, such as 444E982513BF546050C2D079FF5D65AB6E318E1AB5C1C.

Embodiments of the invention provide for methods and systems that ensure that actions performed by nodes (e.g., devices) in a network of nodes (e.g., an IoT network) are securely and legitimately performed. Some embodiments of the invention enable the secure determination and performance of device actions by devices in a device network, using at least two blockchains managed by the network of IoT devices. A first blockchain can store device operational data records including operational data such as sensor readings produced by devices (e.g., temperature), the operational states (e.g., on or off) of devices, resource consumption data (e.g., electricity usage data, water usage data, and network data usage data), etc. A second blockchain can store device action records. The use of separate blockchains for operational data and action data is preferable, since the integrity and management of the individual types of data can be more easily tracked, managed, and read.

Device actions can be initiated by commands or instructions that the devices can execute. Device actions can include changing device states (e.g., switching a device on or off, increasing or decreasing an operational parameter, etc.), activating actuators or other mechanical systems in the devices, initiating communications with external devices, etc.

In some embodiments, a node in the network of devices such as an endpoint device can collect the operational data from the other devices in the network of devices, and can write the operational data to a first blockchain. This can be done in a continuous manner. At some point in time, a device in the network of devices may wish to perform an action. For example, a device such as a washing machine may wish to order more laundry detergent because a sensor in a washing machine indicates that an amount of stored detergent is low. The device, or the endpoint device, may recognize that the device wants to perform the action, and can determine if the action to be performed is valid. To determine of the action to be performed is valid, the device, or the endpoint device, can read the operational data off of the first blockchain, and may optionally read previous action data stored in a second blockchain. The first and second blockchains may be stored on each device in the network in some embodiments. They may alternatively be stored only on an endpoint device if the endpoint device is secure and behaves as a central authority to the device network.

The device, or the endpoint device, may compare the read operational data to determine if the operational data is consistent with the requested action. For example, if the requested action is a request to purchase additional laundry detergent, operational data stored in the first blockchain that may include recent low power consumption data from an electric meter and recent low water consumption data from a water meter may suggest that the washing machine has not been recently used. This may be inconsistent with the request by the washing machine to order more detergent. In some embodiments, if the requested action is determined to be valid by the device, or the endpoint device, the device or the endpoint device, can write the device action to the second blockchain. At this point, the action is validated by the network, and the action may be performed by the device. If the endpoint device is making the validity determination, the endpoint device may authorize the device requesting the action to perform the action.

Embodiments of the invention provide advantages over conventional device interactions. For example, as explained above, individual devices in a network of devices can be hacked or altered in some way that is inconsistent with the legitimate operation of the individual devices. Embodiments of the invention address this problem by providing for a mechanism to ensure that actions being requested by devices in the network are in agreement with data outside of the requesting devices. Such data may be stored in blockchains which may be immutable.

Before describing specific technical details of embodiments of the invention, a high level description of an example use case may be useful in understanding embodiments of the invention. Referring to FIG. 1, this example use case involves a machine ecosystem 100 such as a "washing machine ecosystem." The washing machine ecosystem can comprise a collection of IoT devices, including a first device 102, which may be a washing machine, a second device 104, which may be electricity meter, and a third device 106, which may be a water meter. The first device 102, the second device 104, and the third device 106 may be in a user's home, and may be part of a blockchain network. These IoT devices can collectively determine tasks or actions (which in a conventional system would typically be performed by the user) and perform those tasks or actions, such as paying an electrical bill, paying a water bill, or ordering additional laundry detergent. Further, the IoT devices in the washing machine ecosystem can validate any actions taken by any devices. In some embodiments, the validation of actions by the IoT devices can require a consensus of devices in the network before the actions can be executed. This makes the washing machine ecosystem resistant to misuse or hacking.

If, for example, the washing machine is hacked, the hacker cannot force the washing machine to order large amounts of laundry detergent from a fraudulent supplier. As another example, if an electric company is fraudulently or inadvertently overcharges the user for electricity use, the washing machine ecosystem can determine that it is being overcharged and may not pay the electricity bill.

The first, second, and third devices 102, 104, 106 in FIG. 1 can be IoT devices, and can possess electronics that enable them to communicate with one another and participate as nodes in a blockchain network. Each IoT device can produce operational data, either from sensors or internal memory registers, and can write the operational data to a first blockchain (e.g., blockchain A) 108, which serves as an immutable record of operational data from the first, second, and third devices 102, 104, 106. The operational data relates to the operational state of each IoT device in the machine ecosystem 100. For example, the first device 102 in the form of a washing machine may produce operational data including the number of laundry cycles performed, how much laundry detergent has been used, how long washing machine 102 has been on, etc. For the second device (e.g., electricity meter) 104, the operational data may comprise the electric power consumption of the washing machine and other appliances in a house that contains the washing machine. For the third device 106 (e.g., the water meter), the operational data may comprise water usage by the first device (e.g., the washing machine) 102 and other devices in the house.

Once each device 102, 104, 106, has written its respective operational data within a block or blocks in the first blockchain 108, each device 102, 104, 106 can retrieve all the operational data by reading the most recent blocks (e.g., five or less) from the first blockchain 108. In this way each IoT device 102, 104, 106 can acquire all operational data produced by all the IoT devices 102, 104, 106 in the machine ecosystem 100.

Figure 2:
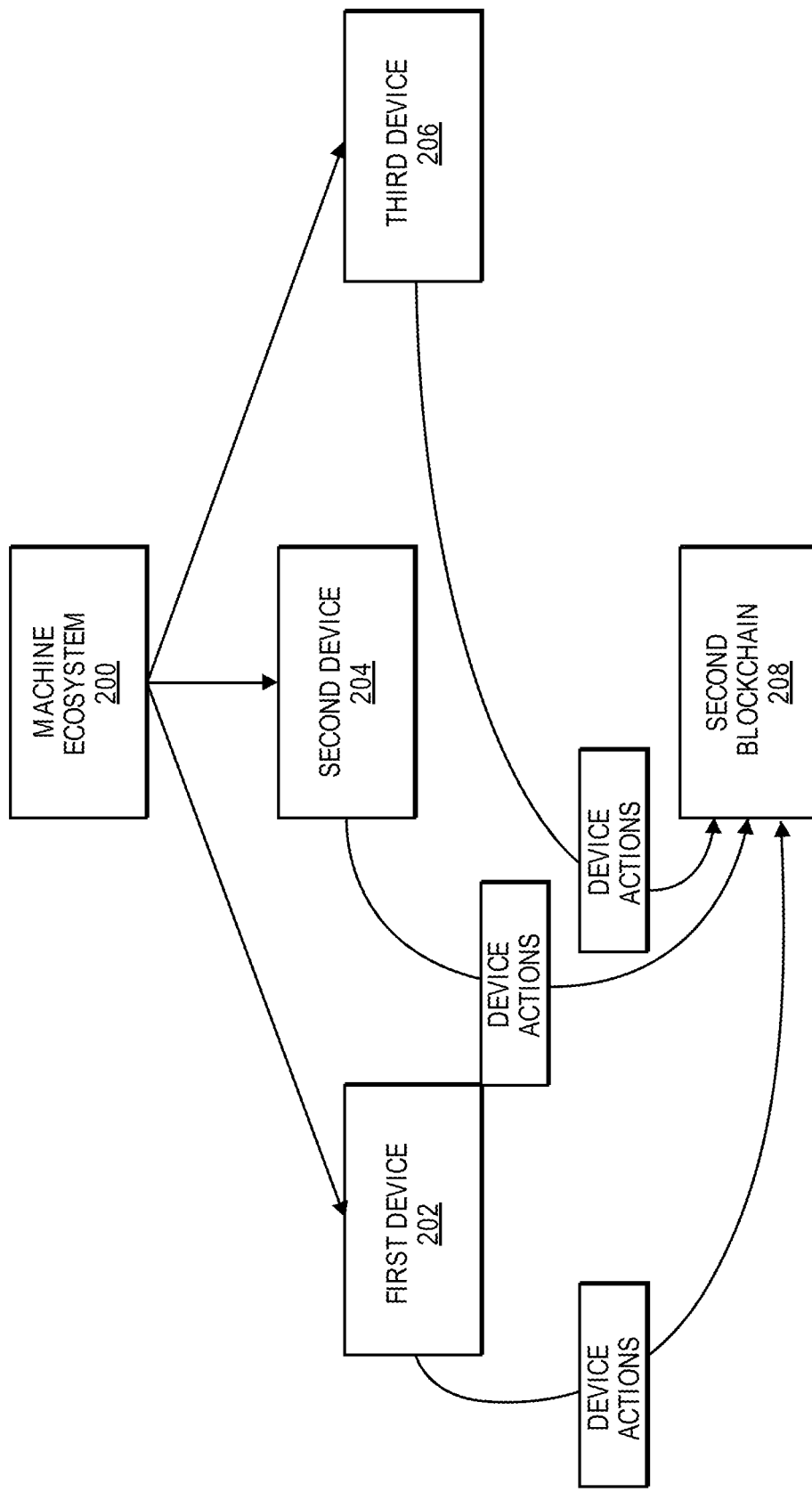
FIG. 2 shows a block diagram of an exemplary IoT device ecosystem writing to a second blockchain according to some embodiments.

FIG. 2 shows the machine ecosystem (e.g., the washing machine ecosystem) 200, comprising a first device (e.g., a washing machine) 202, a second device (e.g., an electricity meter) 204, a third device (e.g., a water meter) 206, and second blockchain 208. The machine ecosystem 200 and its devices 202, 204, 206 can be similar or the same as the machine ecosystem 100 and its devices 102, 104, and 106 in FIG. 2. However, in FIG. 2, the second blockchain 208 is distinct from the first blockchain 108. While the first blockchain 108 comprises operational data records, the second blockchain 208 comprises device action records. Device actions include any actions that can be performed or executed by a device in the machine ecosystem 200. As an example, a device action for the first device 202 could be "start wash" or "send an order for more laundry detergent to a detergent supplier." Device actions for the second device (e.g., the electricity meter) 204 and the third device (e.g., the water meter) 206 could be "pay electric company" or "pay water company," respectively.

Each IoT device in the machine ecosystem 200 can determine a set of device actions on their own by analyzing its own data or according to a predetermined schedule or protocol. For example, an action according to a predetermined schedule or protocol might be for a washing machine to order laundry detergent once per month. In other embodiments, actions can be based on operational data read from the first blockchain 108 in FIG. 1. Each IoT device can run code or algorithms that enable it to determine a set of IoT device actions. For example, the first device (e.g., the washing machine) 202 can have operational data corresponding to a quantity of remaining laundry detergent. The first device (e.g., the washing machine) 202 can use code or other functions to compare this quantity to a threshold, and if less laundry detergent remains than the threshold, the first device (e.g., the washing machine 202) can determine a device action such as "order additional laundry detergent."

Notably, an IoT device can generate device actions corresponding to other IoT devices. For example, the first device (e.g., the washing machine 202) can determine a device action such as "pay the electric bill," which is normally performed by the second device (e.g., the electricity meter) 204. The first device (e.g., the washing machine) 202, the second device (e.g., the electricity meter) 204, and the third device (e.g., the water meter 206) can each write their determined device actions to the second blockchain 208.

In some embodiments, the IoT devices can validate actions by determining if an action is inconsistent with operational data on the first blockchain 108. If it is, then the IoT devices may not write the action to the second blockchain 208. In some embodiments, the devices in the network can achieve consensus on device actions before they are written to the second blockchain 208. This consensus process may involve determining that all the devices in the network agree that the device actions are consistent with the operational data. For example, if the electricity meter reported that one KWh of electricity was used, but produced a device action such as "pay the electric company $100," this device action would not be consistent with the operational data, as one KWh costs less than $100. The other IoT devices can verify this device action using the operational data, and reject it. As such, consensus would not be reached and the device action would not be written to second blockchain 208.

Figure 3:
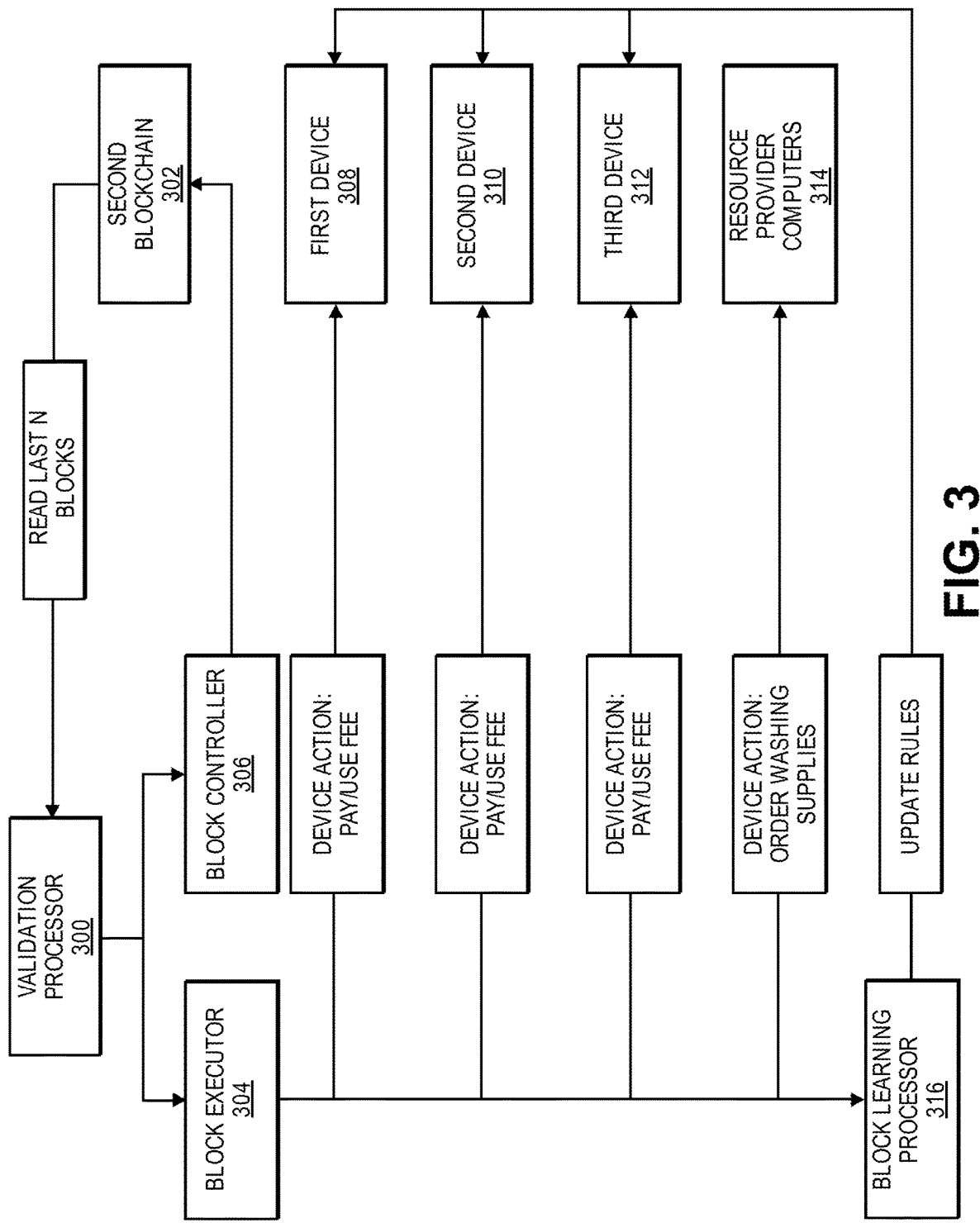
FIG. 3 shows a flow diagram of IoT device action execution according to some embodiments.

FIG. 3 shows a process flow diagram for executing the device actions written to the second blockchain 302. FIG. 3 depicts an embodiment where a validation process is performed by a validation processor 300 after the device actions have been written to the second blockchain 302. In some embodiments, validation may be achieved before device actions have been written to the second blockchain 302.

Block controller 306 can access the second blockchain 302 and read the last N blocks of device actions. The machine ecosystem may execute device actions at a different rate than it produces them. As such, there may be multiple blocks of device actions that need to be executed. These actions may be contained in the most recent N blocks on the second blockchain 302. The block controller 306 may be a device external to the devices in the machine ecosystem. However, it may also be implemented as a software or hardware module in the IoT devices in the machine ecosystem. The last N blocks of data can be read by the validation processor 300, which similarly may be implemented as separate device, or hardware or software contained in the IoT devices (i.e., the first device (e.g., a washing machine) 308, the second device (e.g., the electricity meter) 310, and the third device (e.g., the water meter) 312).

The validation processor 300 can validate any actions to be performed, and this may optionally include a verification that the IoT devices 308, 310, 312 have achieved consensus. As one example of consensus, all devices may have to achieve total agreement that the device actions to be performed are consistent with the operational data in the first blockchain and/or past actions written in the second blockchain 302. Alternatively, a consensus mechanism could involve a majority vote, where if two of the three IoT devices are in consensus, then consensus has been reached on the device action. The validation processor 300 can determine which device actions have achieved consensus, which can be passed to the block executor 304.

The block executor 304 can be implemented as independent hardware or as a software or hardware module on each of the IoT devices and can execute the device actions. Execution of a device action depends on the nature of the device action. A device action such as "turn on IoT lightbulb #3" could be executed by driving an electrical current through input terminals of "IoT lightbulb #3," while a device action such as "pay the electricity bill" could involve a number of computerized communications between the block executor 304, a computer associated with the power company, and an authorization computer.

As examples, for the first device (e.g., the washing machine) 308, the block executor 304 could execute a device action paying for the fee associated with the first device's use, the executed device action for the second device (e.g., the electricity meter) 310 could comprise paying the electrical bill, the executed device action for the third device (e.g., the water meter) 312 could comprise paying the water bill, and an executed device action for the first device (e.g., the washing machine) 308, or another IoT device could be ordering washing supplies (such as laundry detergent) from one or more resource provider computers 314 (e.g., a merchant computer).

Additionally, the devices actions can be transmitted to a block learning processor 316. The block learning processor 316 can use any appropriate learning algorithm, such as machine learning, to evaluate the device actions and determine if any changes need to be made to the rules, code, or algorithm that generates the device actions. For example, the block learning processor 316 could learn that one IoT device is using a different set of rules to generate device actions, and as such, all device actions produced by that device fail to achieve consensus. The block learning processor 316 could push an updated ruleset to that IoT device, such that its rules are in sync with the other IoT devices.

The following examples may further illustrate the concepts of operational data, device actions, and consensus in some exemplary IoT device networks.

As a first example, a "washing machine ecosystem" may comprise an IoT washing machine, IoT electric meter, and IoT water meter. These IoT devices may write operational data to blockchain A, including data related to the usage of the washing machine (e.g., the number of washing machine cycles, number of loads of laundry, or consumption of detergent), electric power consumption and water consumption. The IoT devices may be able to relate these operational data based on known relationships. For example, the IoT washing machine may consume a gallon of water and 1 kWh of electricity per load of laundry, relating water and power consumption to washing machine usage. Each IoT device may implement an algorithm in order to determine operational data based on these relationships. This algorithm may be used as part of a validation algorithm, which can be used to confirm that device actions produced by the IoT devices are consistent with the operational data and with one another.

Each IoT device in the washing machine ecosystem may produce device actions based on the operational data. In some cases, these device actions may correspond to transactions or other payments. For example, the IoT water meter may output a device action involving paying a water company for the water consumed. The IoT devices in the washing machine ecosystem validate the device actions to execute.

To this end, the IoT devices can use the algorithms to relate the operational data in order to verify produced device actions. As an example, the IoT water meter may output a device action involving paying a water company $10.00 for the water consumed. The IoT water meter may calculate the dollar amount of the cost of water by multiplying the operational data corresponding to water usage to a known rate, e.g., $0.10 per gallon. The other IoT devices may verify the $10.00 payment device action by determining the cost using other operational data and the relationship algorithms. For example, as one gallon of water is consumed for each load of laundry, the IoT washing machine may verify the cost by multiplying the number of loads of laundry by the cost of water per gallon. As another example, as one 1 kWh of electricity is consumed per load of laundry, the IoT electric meter may verify the cost by multiplying the amount of electricity consumed by the number of loads of laundry.

If, for example, the water meter is compromised, either by a malicious hacker or water company, or due to a malfunction, the water meter may output a device action that is inconsistent with the operational data. For example, a payment to the water company for $10.00 is inconsistent with only four loads of laundry being performed, or electrical consumption of only 4 kWh. If the IoT devices produce inconsistent device actions, or device actions are verified as incorrect, the IoT devices have not validated the device actions, and may further have not achieved consensus. In some cases, the IoT devices will not write device actions to blockchain B, or execute those device actions if they have not been validated and/or if consensus has not been achieved. This prevents device actions from compromised or malfunctioning devices from being executed.

As another example, a connected car ecosystem can comprise IoT devices such as an IoT gas tank, IoT odometer and IoT brake systems. These IoT devices can write operational data such as the gasoline consumption, miles traveled, and wear and tear of brake pads to blockchain A. These operational data can similarly be related by an algorithm implemented on the IoT devices. For example, if the car's mileage per gallon is known, gas consumption can be related to the miles traveled. If the mean time to failure of the brake pads is known, the wear and tear of the brake pads can be related to the miles traveled, and indirectly to gas consumption.

In some embodiments, each IoT device in the connected car ecosystem can produce IoT device actions based on the operational data. For example, the IoT odometer could produce device actions such as stopping for gas (in a self-driving connected car) or requesting engine servicing (e.g., every 30,000 miles). If the IoT odometer is compromised, either by a hacker or due to a malfunction, the IoT odometer could produce device actions that are not consistent with the operational data or the device actions produced by the other IoT devices. For example, the IoT odometer may output a device action requesting that the car stop for gas, because its odometer reading states that the car has traveled 200 miles. However, the IoT gas tank could determine, based on the gasoline usage operational data, that the car has only consumed enough gas to travel 50 miles, and thus does not need to stop for gas. The IoT gas tank and IoT odometer would not be in consensus. Consequently, the "stop for gas" device action would not be written to the second blockchain or executed by any IoT device in the connected car ecosystem.

As a third example, a connected house ecosystem could consist of an IoT air conditioning unit, an IoT thermometer, and an IoT proximity/movement sensor. These IoT devices can write operational data to blockchain A. The operational data may include data such as the usage of the IoT air conditioning unit (e.g., power consumed, or time on), the temperature, and data regarding the movement of objects in the house. These operational data can similarly be related by an algorithm implemented on the IoT devices.

Each IoT device in the connected house ecosystem can produce IoT device actions based on the operational data. For example, the IoT air conditioning unit could produce device actions such as paying the electric company for the electric power consumed by the air conditioning unit. If the air conditioning unit is compromised, either by a hacker or due to a malfunction, the air conditioning unit could produce device actions that are inconsistent with the operational data or the device actions produced by the other IoT devices. For example, the IoT air conditioning unit may output a device action such as "pay electric company $10 for power consumption," because the electricity consumption operational data states that the IoT air conditioning unit has consumed 100 kWh of electricity. However, the IoT thermometer could determine, based on the change in temperature over a period of time, that the IoT air conditioning unit has consumed less than 100 kWh of electricity, and consequently should pay less than $10. The IoT air conditioning unit and IoT thermometer would not be in consensus. As such, the "pay electric company $10" would not be written to blockchain B or executed by any IoT device in the connected house ecosystem.

Figure 4:
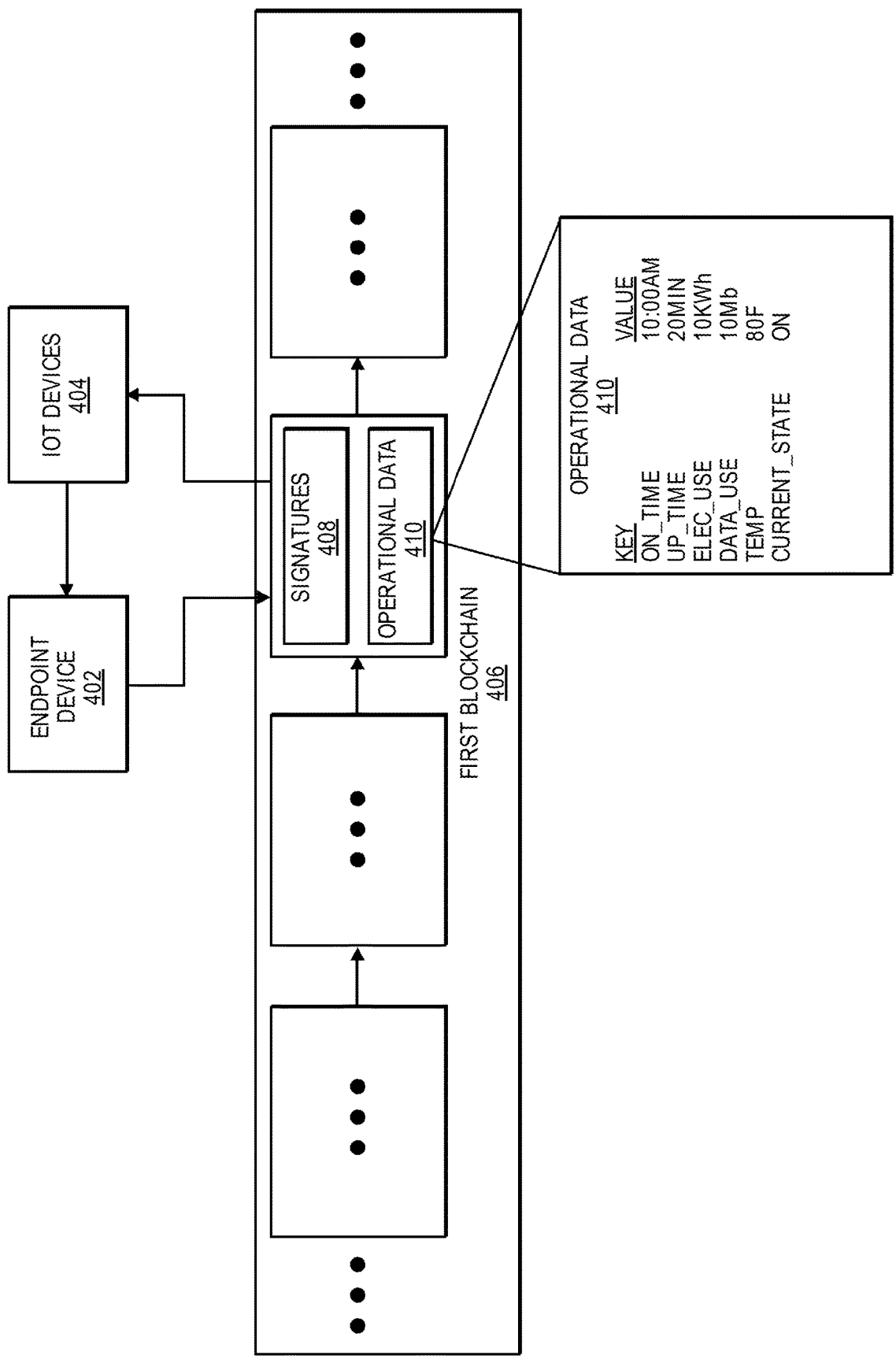
FIG. 4 shows a block diagram of an operational data blockchain according to some embodiments.

FIG. 4 depicts an example of a system including a first blockchain that may be implemented in accordance with embodiments of the invention. In FIG. 4, the first blockchain 406 may comprise a record of operational data 410. The record of operational data 410 may be paired with digital signatures 408 corresponding to IoT devices 404. Signatures 408 may be used to identify and prove the source of an operational data record 410 (i.e., which IoT device of IoT devices 404 produced the operational data).

FIG. 4 additionally depicts examples of operational data records 410. Operational data can be stored in first blockchain 406 as a set of key-value pairs. The key can indicate or identify the operational data. For example, the key "ON_TIME" can refer to the time at which a given IoT device 404 was turned on, the key "UP_TIME" can refer to the amount of time during which a given IoT device 404 has been on continuously, "ELEC_USE" can refer to the total amount of electrical power consumed an IoT device 404, "DATA USE" can refer to the amount of data transmitted and received by an IoT device 404, "TEMP" can refer to the reading of a temperature sensor on an IoT device 404, and "CURRENT STATE" can refer to the operational state of an IoT device 404 (e.g., on, off, standby, etc.).

As described previously with respect to FIG. 1, the IoT devices 404 can write operational data to first blockchain 406 and read operational data from first blockchain 406. However, in some embodiments, operational data from IoT devices 404 may first be pushed or transmitted to endpoint device 402. Endpoint device 402 may collect the received operational data, generate a block, and append the block of operational data 410 to first blockchain 406, rather than each IoT device 404 writing its own operational data to first blockchain 406. Reading and writing operational data 410 from and to first blockchain 406 may involve invoking smart contracts (or "chaincode" in a Hyperledger Fabric model), code for either querying or updating first blockchain 406. In some embodiments, first blockchain 406 may be queried using key-based lookup (e.g., finding values corresponding to a given input key), range queries, composite key queries, or other appropriate querying methods.

Figure 5:
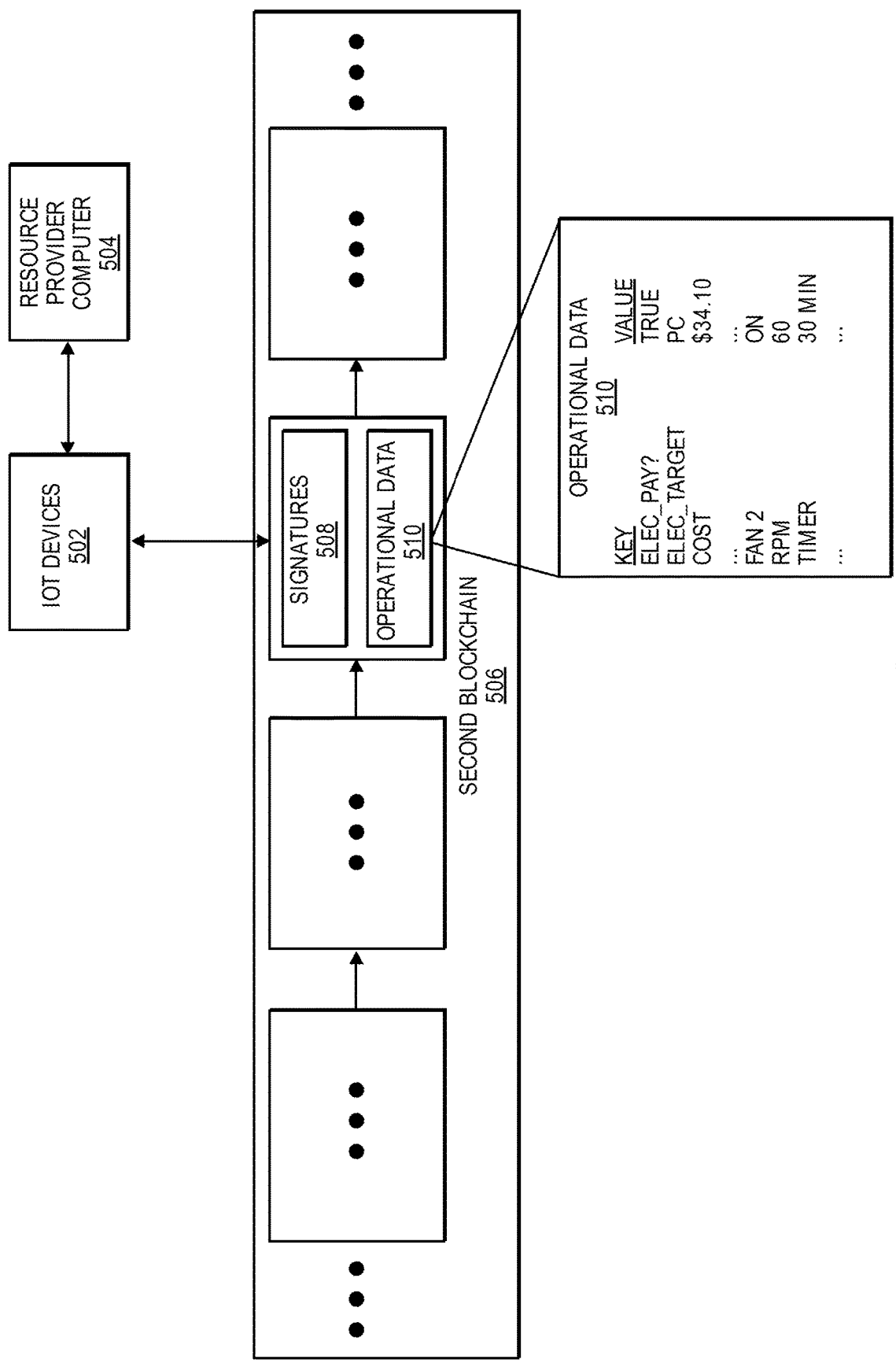
FIG. 5 shows a block diagram of a device actions blockchain according to some embodiments.

FIG. 5 depicts an example blockchain that may be implemented in accordance with some embodiments of the invention. In FIG. 5, second blockchain 506 may comprise a record of device actions 510. The record of device actions 510 may be paired with records of digital signatures 508. Signatures 508 may be used to identify and prove the source of a device action record 510 (i.e., which IoT device of IoT devices 502 produced the device action).

FIG. 5 additionally depicts examples of device action records 510. Device actions can be stored in blockchain B 506 as a set of key-value pairs. The key can provide information about the device action and the value can indicate what action should be performed. Multiple key-value pairs can correspond to a single device actions. For example, the device action "pay electric bill" can have key "ELEC_PAY?" corresponding to a true/false value indicating whether the electric bill needs to be paid, key "ELEC_TARGET" corresponding to a name or identifier of the entity to be paid (such as "PC" for "power company"), and key "COST," corresponding to an amount of money to be paid (e.g., $34.10). Similarly, another set of key-value pairs can correspond to another device action, such as activating or operating an IoT enabled fan. Key "FAN 2" can be an identifier, and the corresponding value can be a general description of the action to be taken (e.g., turn the fan on). Key "RPM" can refer to the rotations per minute at which the fan is set to operate with a corresponding value such as "60." A key such as "TIMER" can correspond to a value of time before the fan is automatically shut off (e.g., 30 minutes).

As described previously with reference to FIGS. 2-3, each IoT device of IoT devices 502 can write device actions 510 to the second blockchain 506 and can read relevant device actions 510 (e.g., device actions that are performed by the reading IoT device) from the second blockchain 506. Reading and writing device actions 510 may involve invoking smart contracts (or "chaincode" in a Hyperledger Fabric model), code for either querying or updating the second blockchain 506. In some embodiments, the second blockchain 506 may be queried using key-based lookups, range queries, composite key queries, or other appropriate querying methods.

Figure 6:
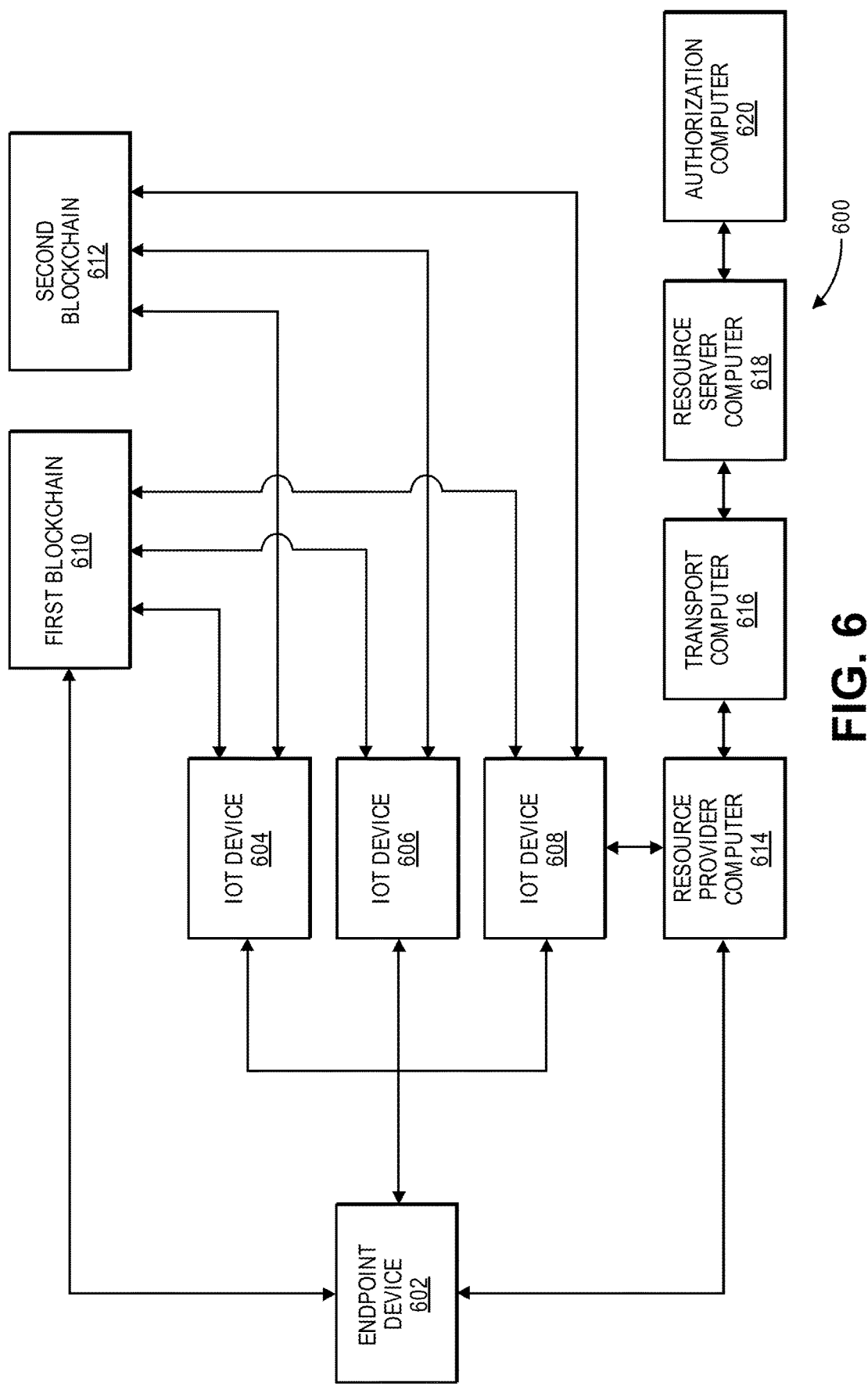
FIG. 6 shows a system block diagram of an exemplary IoT blockchain consensus network according to some embodiments.

FIG. 6 shows an exemplary system 600 for determining and processing device actions according to some embodiments of the invention. The system 600 can comprise an endpoint device 602, IoT device 604-608, first blockchain network 610, second blockchain network 612, resource provider 614, transport computer 616, remote server computer 618, and authorization computer 620. Although three IoT devices 604-608 are shown, embodiments of the invention allow for any number of IoT devices. Endpoint device 602 and IoT devices 604-608 can members of first blockchain network comprising the first blockchain 610, and one or more of these devices may act as nodes in first blockchain network. Some or all of these devices may possess an instance or copy of the first blockchain 610. Similarly, IoT devices 604-608 are members of a second blockchain network comprising the second blockchain 612. One or more of IoT device 604-608 may act as nodes in the second blockchain network, and some or all of these devices may possess an instance or copy of second blockchain. The endpoint device 602, IoT devices 604-608, and the resource provider computer 614 may communicate with one another via any appropriate means, including a communications network. Messages and other communications between the endpoint device 602, IoT devices 604-608, and resource provider computer 614 may be in encrypted or unencrypted form.

A communications network can take any suitable form, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); HyperText transfer Protocol (HTTP); Secure HyperText Transfer Protocol (HTTPS), Secure Socket Layer (SSL), ISO (e.g., ISO 8583) and/or the like.

Endpoint device 602 can be a device or computer that can communicate with IoT devices 604-608 and resource provider computer 614. In some embodiments, endpoint device 602 can collect IoT operational data from IoT devices 604-608 and write the IoT operational data to first blockchain network. This can involve querying or requesting operational data from IoT devices 604-608. In some embodiments, endpoint device 608 can be a node in the first blockchain network including the first blockchain 610. In some embodiments, endpoint device 602 can be an IoT device itself. In other embodiments, endpoint device 602 can be a remote server, such as a cloud server that collects and manages IoT operational data.

IoT devices 604-608 can be a collection of IoT devices in an IoT device network. This can include, for example, a home device ecosystem, such as a "washing machine ecosystem." Such an ecosystem can include, for example, an IoT washing machine, an IoT electric meter, and an IoT water meter. IoT devices 604-608 can communicate with one another through any appropriate means. For example, in a home device ecosystem, IoT devices 604-608 can communicate with one another over a local area network or via Bluetooth.

The first blockchain network comprising the first blockchain 610 may comprises a number of nodes (i.e., IoT devices 604-608 and endpoint device 602). Instances of the first blockchain 610 may be distributed among the IoT devices 604-608. As described above, the first blockchain 610, may be organized in a series of blocks, each comprising operational data entries. For example, one block could contain all operational data (e.g., operating temperature, whether the device is on or off, whether any motors, actuators, or other mechanical systems are engaged, how much data the device is sending or receiving, electricity usage, water usage, fuel usage, etc.) from IoT devices 604-608 corresponding to a certain time or time period (e.g., 8:00 P.M.) and the subsequent block could contain all operational data from IoT devices 604-608 corresponding to a subsequent time period (e.g., 8:05 P.M.). In some embodiments, IoT devices 604-608 may read operational data from the first blockchain by invoking smart contracts (or, in the Hyperledger Fabric model, "chaincode"). Likewise, the endpoint device 604 can invoke smart contracts to write operational data to the first blockchain 610. The first blockchain 610 can be immutable, meaning that once a block is written to the first blockchain 610, it cannot be modified or erased.

The second blockchain 612 can form a blockchain network comprising a number of nodes (i.e., IoT devices 604-608) over which the second blockchain 612 is distributed. Instances of the second blockchain 612 may be distributed among the IoT devices 604-608. As described above, the second blockchain may be organized in a series of blocks, each comprising device actions. For example, one block could contain all device actions (e.g., deactivate IoT device 606, initiate a transaction with resource provider computer 614, etc.) produced by IoT devices 604-608 during a certain time or time period (e.g., 8:10 P.M.) and the subsequent block could contain all device actions corresponding to a subsequent time period (e.g., 8:15 P.M.). In some embodiments, IoT devices 604-608 may determine device actions and validate they, such as by achieving consensus on the device actions before writing the device actions to the second blockchain 612. Similarly, IoT devices 604-608 may read device actions from the second blockchain 612 and execute those device actions. The second blockchain 612 can be immutable, meaning that once a block is written to it, it can't be modified or erased.

Resource provider computer 614 can comprise a computer or computer system associated with a resource provider, such as a merchant. The resource provider computer 614 can provide resources to IoT devices 604-608 or to a user associated with IoT devices 604-608. As an example, in a washing machine ecosystem, resource provider computer 614 can be associated with a resource provider such as a power company. IoT device 608 (or another IoT device) can execute a device action involving issuing a payment to the power company via resource provider computer 614. In some embodiments, resource provider computer 614 may store a payment credential (such as a payment account number (PAN) or a tokenized PAN) associated a user of IoT devices 604-608. The resource provider computer 614 can generate an authorization request message comprising the payment credential and transmit the payment credential to a transport computer 616, which can subsequently be routed to a remote server computer 618 and authorization computer 620. Authorization computer 620 can evaluate the authorization request message and generate an authorization response message, which can be transmitted back to resource provider computer 614 in order to complete the transaction. In other embodiments, IoT device 608 (or another appropriate IoT device) can store a PAN or tokenized PAN on a secure memory element, and transmit the credential to the resource provider 614. In some embodiments communications between IoT devices 604-608 and the resource provider computer 614 may be encrypted.

Figure 7:
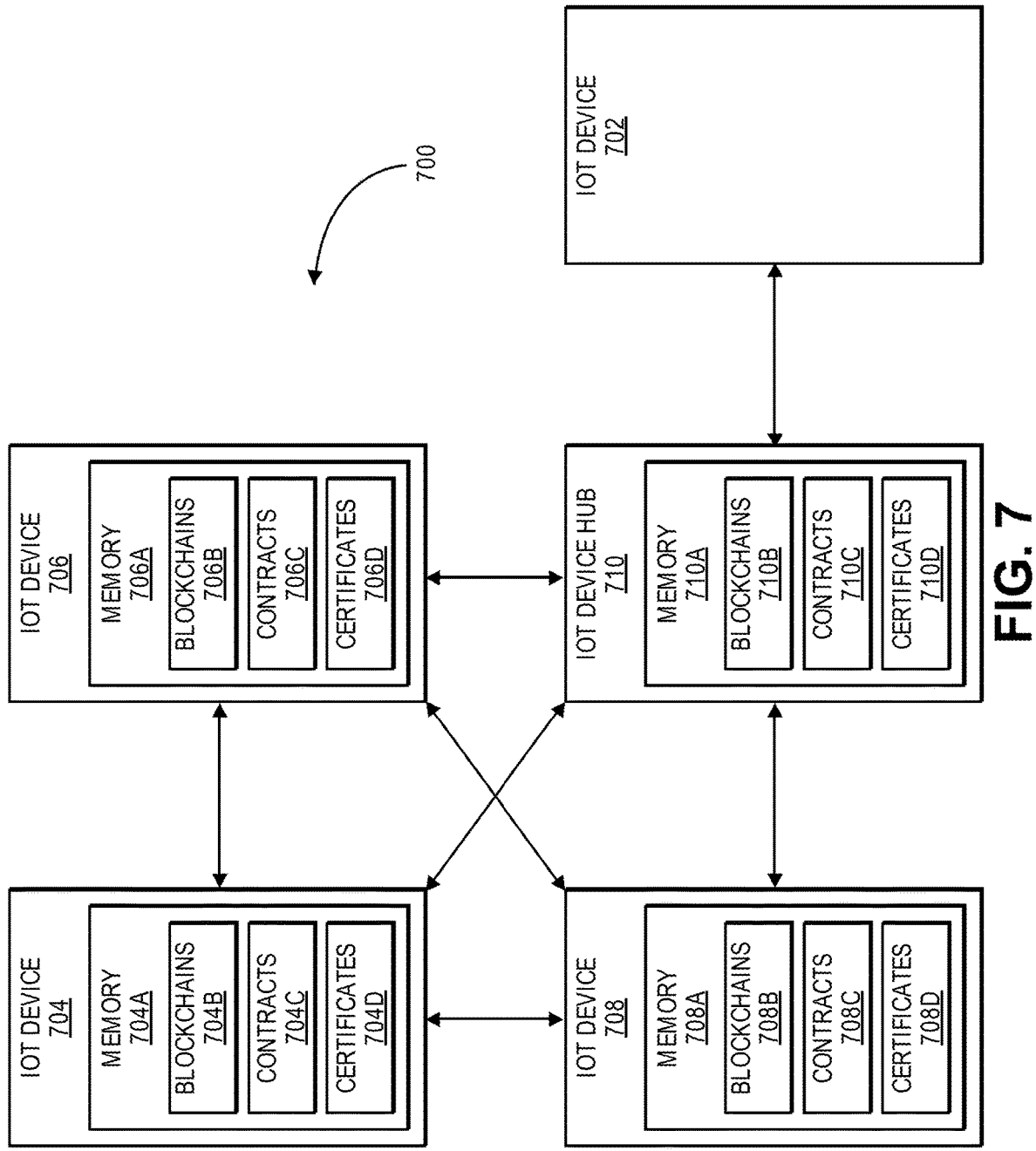
FIG. 7 shows a block diagram of an exemplary IoT blockchain network according to some embodiments.

FIG. 7 shows a block diagram of a blockchain network 700 including 4 IoT device nodes 702-708 and IoT device hub node 710. The number of IoT device nodes was chosen for the purpose of example, blockchain network 700 can include any number of IoT device nodes.

Each IoT device may include a memory 704A-708A that stores a copy of at least a portion of the operational data blockchain (the first blockchain) and the device actions blockchain (blockchain B). IoT devices 704-708 and IoT device hub 710 may additionally store and execute one or more programs to perform functions associated with maintaining blockchains 704B-710B, including, for example, updating blockchains 704B-710B, generating new blocks, or any other similar function.

In some embodiments, some IoT devices in the blockchain network 700 may have limited memory or processing capabilities, such as IoT device 702. An example of such a device is a smart lightbulb. IoT device 702 can be represented in the blockchain network 700 by an IoT device hub 710, a central router or hub device that can write operational data to the first blockchain on behalf of IoT device 702, as well sign operational data or endorse proposed device actions. An example of an IoT hub 710 is a lighting hub that controls multiple IoT light sources.

Blockchains 704B-710B may store any IoT operational data or device actions produced by any of IoT devices 702-708 and 712, and IoT device hub 710, such as the operational data and device actions described with reference to FIGS. 4-5.

Memories 704A-710A may additionally store smart contracts (or chaincodes) 704C-710C. These smart contracts may be invoked by IoT devices 702-708, IoT device hub 710, or external devices or applications, such as endpoint device 602 from FIG. 6.

Further, memories 704A-710A may additionally store digital certificates, such as public key certificates and public and private cryptographic keys (certificates 704D-710D). IoT devices 704-708 and IoT device hub 710 may use the certificates to prove ownership of corresponding public keys. The private keys may be used to sign or endorse operational data or device actions, and the resulting signatures may be verified using the corresponding public keys.

Because IoT devices 704-708 and IoT device hub 710 each store a copy of at least a portion of the first and second blockchains, the first and second blockchains may be verified by comparing the stored copies in multiple IoT devices 704-708 and IoT device hub 710.

Figure 8:
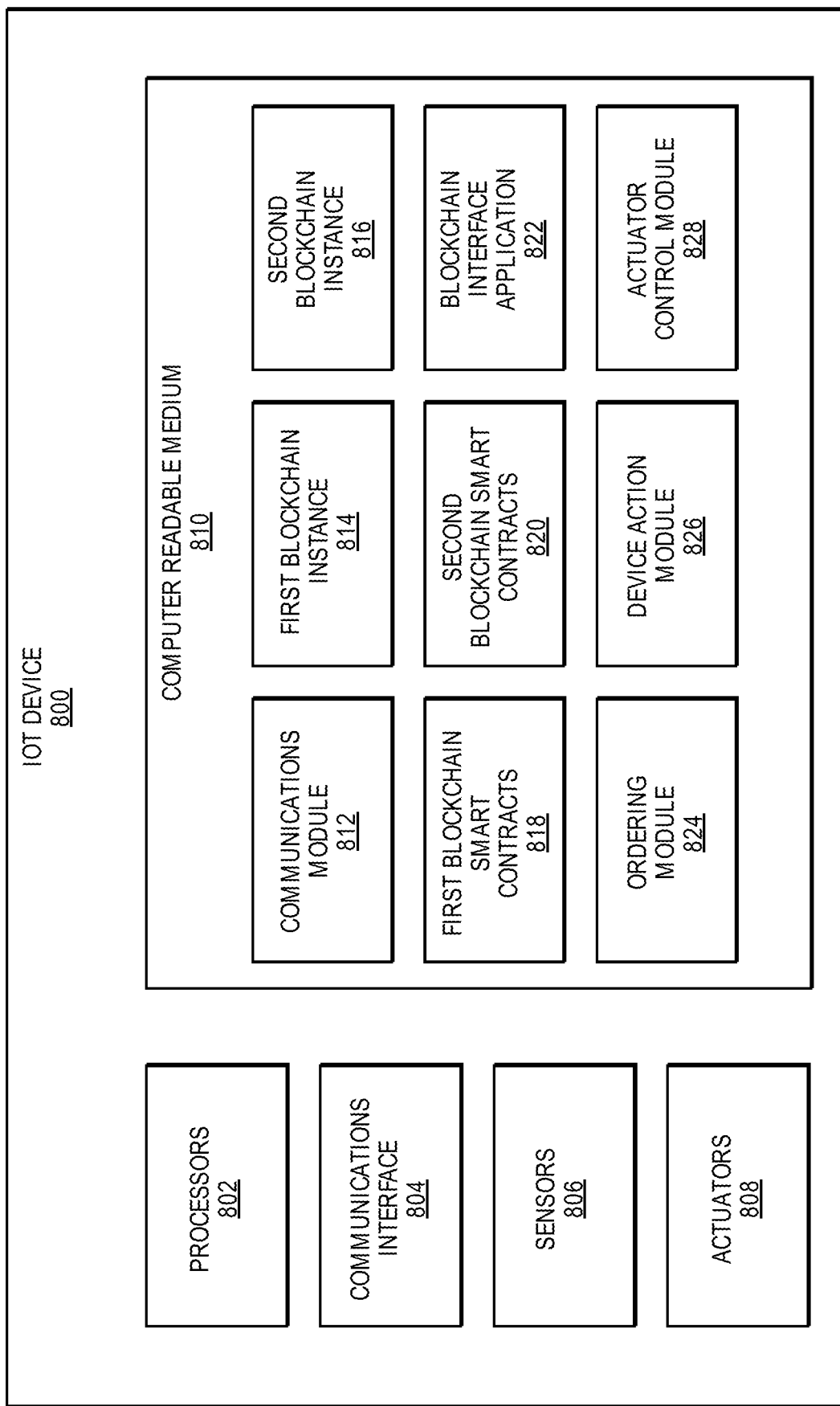
FIG. 8 shows a block diagram of an IoT device according to some embodiments.

FIG. 8 shows a block diagram of an IoT device 800, comprising a processor 802, communications interface 804, sensors 806, actuators 808, and a computer readable medium 810. The computer readable medium 810 comprises a number of software modules and data, including a communications module 812, an instance of the first blockchain 814, an instance of blockchain B 816, smart contracts corresponding to the first blockchain 818, smart contracts corresponding to blockchain B 720, a blockchain interface application 822, an ordering module 824, a device action module 826, and an actuator control module 828.

The processor 802 may be any suitable processing apparatus or device as described above. The communications element 804 may comprise a network interface that enables the IoT device 800 to communicate with other computers, systems, or IoT devices over a network such as the Internet or a local area network.

Sensors 806 can include devices, modules, or subsystems that detect events or changes in the IoT device's 800 environment. Some forms of IoT operational data can be collected by sensors. For example, a thermometer in an IoT air conditioning unit can record the temperature of the air, which can be written to the first blockchain as operational data. Other examples of sensors include multimeters, optical encoders, photodiodes, etc.

Actuators 808 can include devices and other components used to move a mechanism or a subsystem. For example, an actuator can be a motorized hinge on an IoT refrigerator, or a motor on an IoT fan. In some embodiments, a device action may comprise activating or controlling actuators 808. Actuators 808 can be controlled via an actuator control module 828.

Communications module 812 may comprise code that causes or enables the processor 802 to generate messages, reformat messages, and/or otherwise communicate with other entities, computers, and IoT devices, including the endpoint device. The communication module 812 may enable the IoT device 800 to communicate over a network according to any appropriate communication protocol, such as TCP, UDP, etc.

The computer readable medium 810 may comprise code executable by the processors 802 to implement a method comprising: receiving, by the node in a network of nodes, device operational data from a plurality of other nodes in the network of nodes, wherein the node stores a first blockchain and a second blockchain; writing, by the node, the operational data to the first blockchain; determining, by the node or another node in the network that an action should be performed for the node or the another node based on at least some of the operational data; determining, by the node and using the operational data in the first blockchain and/or actions to be performed on the second blockchain, if the action to be performed is valid; and writing, by the node, data relating to the action to be performed on the second blockchain.

The first blockchain instance 814 can comprise a locally stored instance of the operational data blockchain. The first blockchain instance 814 can be stored on computer readable medium 810 in any appropriate form. For example, each block could comprise a series of memory addresses in which the alternating keys and values (i.e., the operational data) of the key-value pair could be stored. The final memory address in a block could contain a pointer to the first memory address in a subsequent block, such that each block points to the next block in the blockchain. The memory containing the first blockchain instance 814 could be protected or tamper-proof, such that it can only be modified using the proper smart contracts.

Second blockchain instance 816 can comprise a locally stored instance of the device action blockchain. Second blockchain instance 816 can be stored on computer readable medium 810 in any appropriate form. For example, each block could comprise a series of memory addresses in which the alternating keys and values (i.e., the operational data) of the key-value pair could be stored. The final memory address in a given block could contain a pointer to the first memory address in a subsequent block, such that each block points to the next block in the blockchain. The memory containing second blockchain instance 816 could be protected or tamper-proof, such that it can only be modified using the proper smart contract. Further, device actions stored on second blockchain instance 816 could be expressed as operational codes (or OPCODES), alphanumeric sequences that can be interpreted by IoT device 800 in order to execute a corresponding device action.

The first blockchain smart contracts 818 can comprise software implementing smart contracts or chaincode that query or update the first blockchain. The first blockchain smart contracts 818 can be written in any supported programming language, such as Go or Java, and can manage the first blockchain via "transactions" submitted by applications such as the blockchain interface application 822. The first blockchain smart contracts 818 can accept arguments, such as operational data produced by IoT device 800. In an exemplary operational data read smart contract, the arguments may include keys, timestamps, or data ranges, among others. For example, argument "ON_TIME" may be used in a smart contract to read all values corresponding to key "ON_TIME" (i.e., the amount of time IoT device 800 has been on continuously) from the first blockchain instance 814.

Second blockchain smart contracts 820 can comprise software implementing smart contracts or chaincode that query or update second blockchain. Second blockchain smart contracts 818 can be written in any supported programming language, such as Go or Java, and can manage the second blockchain via "transactions" submitted by applications such as the blockchain interface application 822. Second blockchain smart contracts can accept arguments, such as operational data read from the first blockchain instance 814, and can produce outputs such as device actions proposed to be added to second blockchain. For example, a smart contract could calculate the amount of money to pay an electricity company as a device action, and could accept arguments such as the amount of electricity consumed and the electricity rate. The smart contract could comprise code multiplying the arguments together to produce the payment amount, which could subsequently be written to second blockchain.

Blockchain interface application 822 can comprise software enabling the IoT device 800 to interact with blockchains A and B. In some blockchain models, such as Hyperledger Fabric, blockchains can only be read or updated via smart contracts, which are invoked via applications. The blockchain interface application 822 can comprise code that invokes and supplies arguments to the first blockchain smart contracts 818 and second blockchain smart contracts 820, in order to read or write operational data or device actions to blockchain instance A 814 or blockchain instance B 816. This can involve conditional logic that evaluates keys or key-value pairs in order to determine the correct smart contract to invoke.

Ordering module 824 can comprise software enabling the IoT device 800 to order proposed transactions chronologically and generate a block of ordered transactions. In some blockchain models, such as Hyperledger Fabric, an "ordering node" orders endorsed transactions chronologically and then forms a block, which is then distributed to other nodes in the blockchain network. The ordering module 824 can comprise code or other functions to accomplish this ordering and distribution. The ordering module 824 can operate in conjunction with communications module 812 and communications interface 804 as part of distributing the ordered blocks.

Action execution module 826 can comprise software and other data enabling the IoT device 800 to execute device actions. As an example, action execution module 826 can comprise software used to initiate a transaction with a resource provider computer. Additionally, action execution module 826 can comprise a secure memory region storing data such as a payment credential (e.g., a PAN) that can be transmitted to a resource provider computer as part of the transaction. As another example, action execution module 826 can comprise software used to change the operational state of IoT device 800, such as turning off IoT device 800 or putting IoT device 800 in a standby mode. In some embodiments, action execution module 826 can work in conjunction with actuator control module 828.

Actuator control module 828 can comprise software used to activate, deactivate, or otherwise control actuators 808. For example, software routines for changing the speed of a fan in an IoT air conditioning unit, or software routines opening up a lock in an IoT safe. The actuator control module 828 may act in concert with the action execution module 826, when for example, executing a device action comprises controlling an actuator (e.g., for a device action such as "turn on IoT fan #2").

Figure 9:
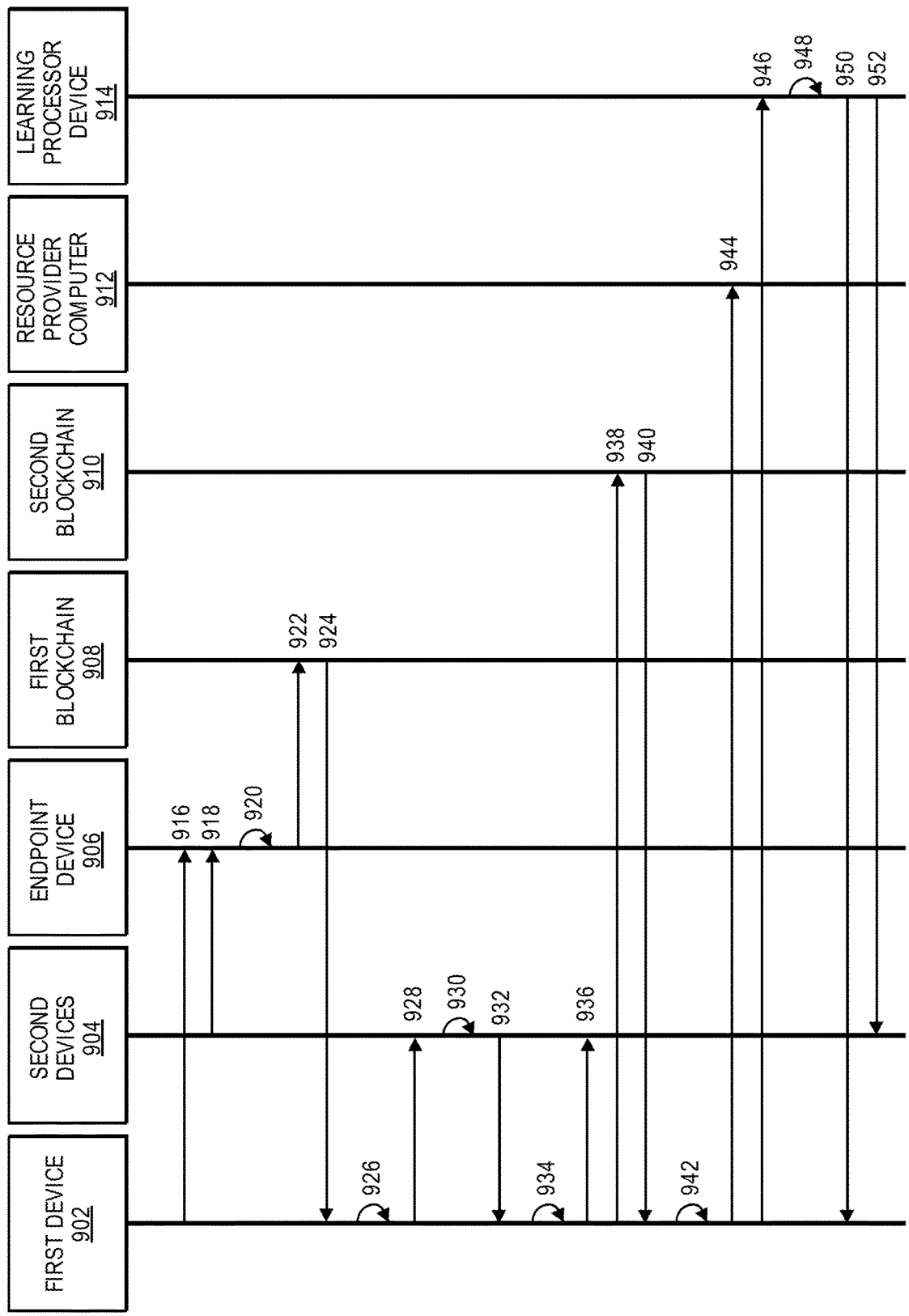
FIG. 9 shows a sequence diagram of a method of securely determining and executing device actions according to some embodiments.

FIG. 9 shows a sequence diagram of a method of securely determining and executing device actions according to some embodiments of the invention. In FIG. 9, one IoT device in the IoT device network is referred to as the "first device 902," and other devices in the IoT device network are referred to as "second devices 904" or "a plurality of second devices."

At step 916, first device 902 can transmit first operational data to endpoint device 906. This first operational data can include any data related to the operation or state of the first device 902, as described above. The first operational data may be transmitted via any appropriate communication network or means in encrypted or unencrypted form. The first operational data may be signed by first device 902 in order to attest to the source of the first operational data. The first operational data may include a number of timestamps corresponding to the time at which the first operational data was captured (e.g., by a sensor or sensing apparatus on first device 902) or the time at which it was transmitted to endpoint device 906.

At step 918, one or more second devices 904 can transmit second operational data to endpoint device 906. This second operational can include any data related to the operation or state of the one or more second devices 904, as described above. The second operational data may be transmitted via any appropriate communication network or other means, either in encrypted or unencrypted form. Each second device of the one or more second devices 904 may sign the corresponding second operational data in order to attest to the source of the second operational data. The second operational data may include a number of timestamps corresponding to the time at which the second operational data was captured (e.g., by sensors or sensing apparatuses on the one or more second devices 904) or the time at which it was transmitted to endpoint device 906.

At step 920, endpoint device 906 can generate a block comprising the first operational data and second operational data. In a blockchain with an endorsement-based consensus algorithm, endpoint device 906 can endorse the first and second operational data by signing it with the endpoint device 906 private key, then order the first and second operational data based on timestamps, such that the first and second operational data is in chronological order. This set of ordered first and second operational data can be used to produce a block that endpoint device 906 can write to the first blockchain 908. The block can contain elements other than the first operational data and second operational data. For example, the first and second operational data could be used to build a Merkel tree. The block can also contain a timestamp, cryptographic nonce, and a hash of the previous block in the first blockchain 908.

At step 922, endpoint device 906 can write the block of first operational data and second operational data to the first blockchain 908. This may involve distributing the endorsed block of first operational data and second operational data to first device 902 and second devices 904. The first device 902 and second devices 904 can verify the endorsement on the block of first operational data and second operational data and append the block to their instances of first blockchain 908.

At step 924, first device 902 (and additionally second devices 904) can read the first operational data and second operational data off the first blockchain 908. This may involve using a blockchain interface application to invoke appropriate smart contracts or chaincode in order to access the operational data written to first blockchain 908. In some embodiments, first device 902 may read the last N blocks of first operational data and second operational data, corresponding to a predetermined period of time. For example, if one block of operational data is written to first blockchain 908 every minute, but first device 902 only reads operational data every five minutes, first device 902 may read the last five blocks of first operational data and second operational data from first blockchain 908.

At step 926 first device 902 determines one or more first device actions, and generates a first message comprising the one or more first device actions. The actions to be performed may be pre-programmed actions (e.g., purchase a particular item at a specific interval of time). This may alternatively involve operating an algorithm or code that takes operational data as inputs and determines appropriate device actions as outputs. For example, in a washing machine ecosystem, operational data such as "remaining amount of laundry detergent" may be compared against a laundry detergent threshold. If the remaining amount of laundry detergent is less than the threshold, the first device 902 may determine a first device action such as "order additional laundry detergent." Further, first device 902 may sign the one or more first device actions individually or sign the first message comprising the one or more first device actions, in order to indicate the source of the one or more first device actions, and prove that the one or more first device actions were generated by an IoT device in the IoT device network.

At step 928, first device 902 optionally broadcast the first message to the network of IoT devices, including second devices 904 and the endpoint device 906. In some embodiments, broadcasting comprises transmitting the first message to each second device of second devices 904, and optionally the end point device 906, individually, either directly or via a network such as a local area network or the Internet. In other embodiments, first device 902 may be able to communicate with some second devices of second devices 904 but not with others. For example, first device 902 may not be able to communicate directly with an IoT lightbulb, but can communicate with the IoT lighting hub that controls the IoT lightbulb. In this case, broadcasting can comprise transmitting the first message to the IoT lighting hub, which can subsequently forward the first message to the IoT lightbulb.

At step 930, the first device 902, or the second devices 904 (and optionally the endpoint device 906), can determine, using the operational data in the first blockchain and/or actions to be performed on the second blockchain, if the action to be performed is valid. It can determines if it is valid by determining that operational data for at least two devices (or nodes) in the plurality of devices (or nodes) is inconsistent with the action to be performed. For example, if a requested action by a washing machine (e.g., buy a lot of detergent) is inconsistent with operational data from an electric meter and a water meter (e.g., the electricity and water usage indicated by the electric meter and the water meter is very low and indicates that the washing machine is not used very much), then the determination can be made that the requested action is invalid. In addition, past actions performed by the devices on the second blockchain may also be used to determine the validity of the action to be performed. For example, past data regarding energy consumption by a washing machine (e.g., a low historical amount of electricity for the washing machine) or past detergent purchase data may be inconsistent with a current request by the washing machine to purchase a large amount of detergent.

At step 930, first device 902, the second devices 904, and/or the endpoint device 906 can validate the one or more first device actions and can endorse the one or more first device actions by signing them using their private keys. The validation process can involve determining that the first device actions are consistent with the first operational data and second operational data. For example, the second devices 904 can validate the one or more first device actions using second smart contracts corresponding to a consensus algorithm. These second smart contracts can accept the first operational data and second operational data as inputs and generate comparison first device actions, then compare the comparison first device actions to the first device actions. If the comparison first device actions match the first device actions, second devices 904 can endorse the first device actions by signing the first device actions with one or more second device private keys corresponding to second devices 904. Alternatively, second devices 904 can generate one or more second proposal response messages comprising the one or more first device actions, and endorse the one or more second proposal response messages using the one or more second private keys, indicating that the device actions that first device 902 proposed to add to second blockchain 910 (Le., the one or more first device actions) have been approved and endorsed by second devices 904.

Additionally, at step 930, second devices 904 additionally determine one or more second device actions based on the first operational data and second operational data, and generate one or more second message comprising the one or more second device actions. This may involve using an algorithm, code, or a smart contract that takes operational data as inputs and determines appropriate device actions as outputs. For example, in a washing machine ecosystem, operational data such as "water consumed" may be compared against a water consumption threshold. If the water consumption exceeds the threshold, second devices 904 may determine a first device action such as "pay water bill." Further, second devices 904 may sign the one or more second device actions individually, or sign the second messages comprising the one or more second device actions in order to indicate the sources of the one or more second device actions and prove that the one or more second device actions were generated by legitimate IoT devices in the IoT device network.

At step 932, first device 902 receives the one or more second messages and the one or more endorsed first device actions from second device 904. The first device 902 may receive these second messages and first device actions either directly, or via a communications network such as a local area network.

At step 934, first device 902 validates and endorses the one or more second device actions. The validation process can involve determining that the second device actions are consistent with the first operational data and second operational data. For example first device 902 can verify the one or more second device actions using smart contracts corresponding to a consensus algorithm. These second smart contracts can accept the first operational data and second operational data as inputs and generate comparison second device actions, then compare the comparison second device actions to the second device actions. If the comparison second devices actions match the one or more second device actions, first device 902 can verify and endorse the one or more second device actions by signing the one or more second device actions using a first private key corresponding to first device 902. Alternatively, first device 902 can generate one or more first proposal response messages comprising the second device actions, and endorse the one or more first proposal response messages using the first private key, indicating that the device actions that second devices 904 proposed to add to second blockchain 910 (i.e., the one or more second device action) have been approved and endorsed by first device 902.

At step 936, first device 902 can transmit the endorsed second device actions back to second devices 904 via any appropriate means or communication network.

In other embodiments of the invention, step 928 above need not occur. For example, the first device 902 could determine the action to be performed, read the operational data that may reside on it, or in the endpoint device 906, and determine if the action to be performed is not consistent with the read operational data. The first device 902 could then write the action to the second blockchain 910 if the action was determined to be valid.

At step 938, first device 902 can write the one or more first device actions to second blockchain 910. Additionally, second devices 904 can write the one or more second device actions to second blockchain 910. This can comprise ordering the one or more first device actions and one or more second device actions, generating a block comprising the ordered one or more first device actions and one or more second device actions, and distributing the block to first device 902 and second devices 904. In some embodiments, each IoT device can then invoke smart contracts or chaincode used to verify that the device actions in the block meet the consensus policy before writing (i.e., appending) the block to second blockchain 910.

Verifying that the device actions meet the consensus policy depends on the nature of the consensus policy itself. If the consensus policy requires complete consensus, the IoT devices may verify that each device action has been endorsed by each device in the IoT device network (i.e., first device 902 and all second devices 904). If the consensus policy requires a simple majority, the IoT devices may verify that each device action has a majority of endorsements. Device actions that fail to meet the consensus policy will not be written to second blockchain 910, while device actions that meet the consensus policy will be written to second blockchain 910.

At step 940, first device 902 can read device actions corresponding to IoT device 902 (e.g., device actions that IoT device 902 will execute) from second blockchain 910. This may involve first device 902 invoking any appropriate smart contracts or chaincode in order to query second blockchain 910 for any device actions with a key indicating those device actions are to be performed by IoT device 902. In other embodiments, the first device 902 need not read device actions from the second blockchain, as it may already know the actions to be performed.

At step 942, first device 902 can execute the one or more device actions corresponding to the first device. In some embodiments, executing the one or more device actions may comprise operating any number of appropriate software modules and mechanical systems. For example, a device action such as "go into power save mode" on an IoT refrigerator may involve reducing the flow rate of coolant through the IoT refrigerator. In some embodiments, executing a device action may involve initiating an interaction or transaction with resource provider computer 912.

At step 944, first device 902 can transmit a request to initiate an interaction to resource provider computer 912. This request may include any appropriate information necessary to complete the interaction, such as a payment credential, device identifier, or user identifier. Interactions with resource provider computer 912 are discussed in greater detail with reference to FIG. 10.

At step 946, first device 902 can transmit the first operational data, the second operational data, the one or more first device actions and the one or more second device actions to learning processor device 914 via any appropriate means or communication network.

At step 948, learning processor device 914 can generate an updated consensus algorithm. This may be accomplished with any appropriate machine learning model. For example, the learning processor device 914 can use the received data and device actions to determine whether the consensus algorithm results in too many or too few device actions being rejected. The learning processor device 914 can modify the consensus algorithm to influence the rate of device action rejection. For example, if the consensus algorithm requires that a device action be endorsed by 80% of the IoT devices in the IoT device network, the learning processor device 914 can reduce the endorsement rate to, for example, 70%, in order to improve the number of approved device actions.

At step 950, learning processor device 916 can transmit the updated consensus algorithm to first device 902, either directly or via an appropriate communications network such as a local area network or the Internet.

At step 952, learning processor device 916 can transmit the updated consensus algorithm to second devices 904, either directly or via an appropriate communications network such as a local area network or the Internet.

In other embodiments, the endpoint device 906 may be a secure device and may store the first blockchain 908 and the second blockchain 910, and copies of these blockchains may not be stored in the first and second devices 902, 904. In such embodiments, operational data from the first device and second 902, 904 can be continuously transmitted to the endpoint device 906, and the endpoint device may update the first blockchain 908.

At some point, the first and second devices 902, 904 may determine actions to be performed. The first and second devices 902, 904 may determine those actions on their own, or may request data from the endpoint device 906 and may determine the actions based upon the requested data. For example, in embodiments of the invention, the endpoint device 906 (or node) may receive requests from other nodes or devices to read the operational data in the first blockchain, and it may then transmitting the requested operational data to the requesting devices (or nodes). The action to be performed by the requesting device (or node) may then be based upon the read operational data.

When actions are to be performed by the first and second devices 902, 904, the first and second devices 902, 904 may send requests to the endpoint device 906 to perform those actions. The endpoint device 906 may then determine if those actions are valid as described above, and may cause the first or second devices 902, 904 to perform those actions if they are valid. The endpoint device 906 may then update the second blockchain 910 as described above. In some embodiments, the endpoint device 906 may receive an instruction to write the actions to the second blockchain after receiving a request to do so from the first or second devices 902 that performed the actions.

Figure 10:
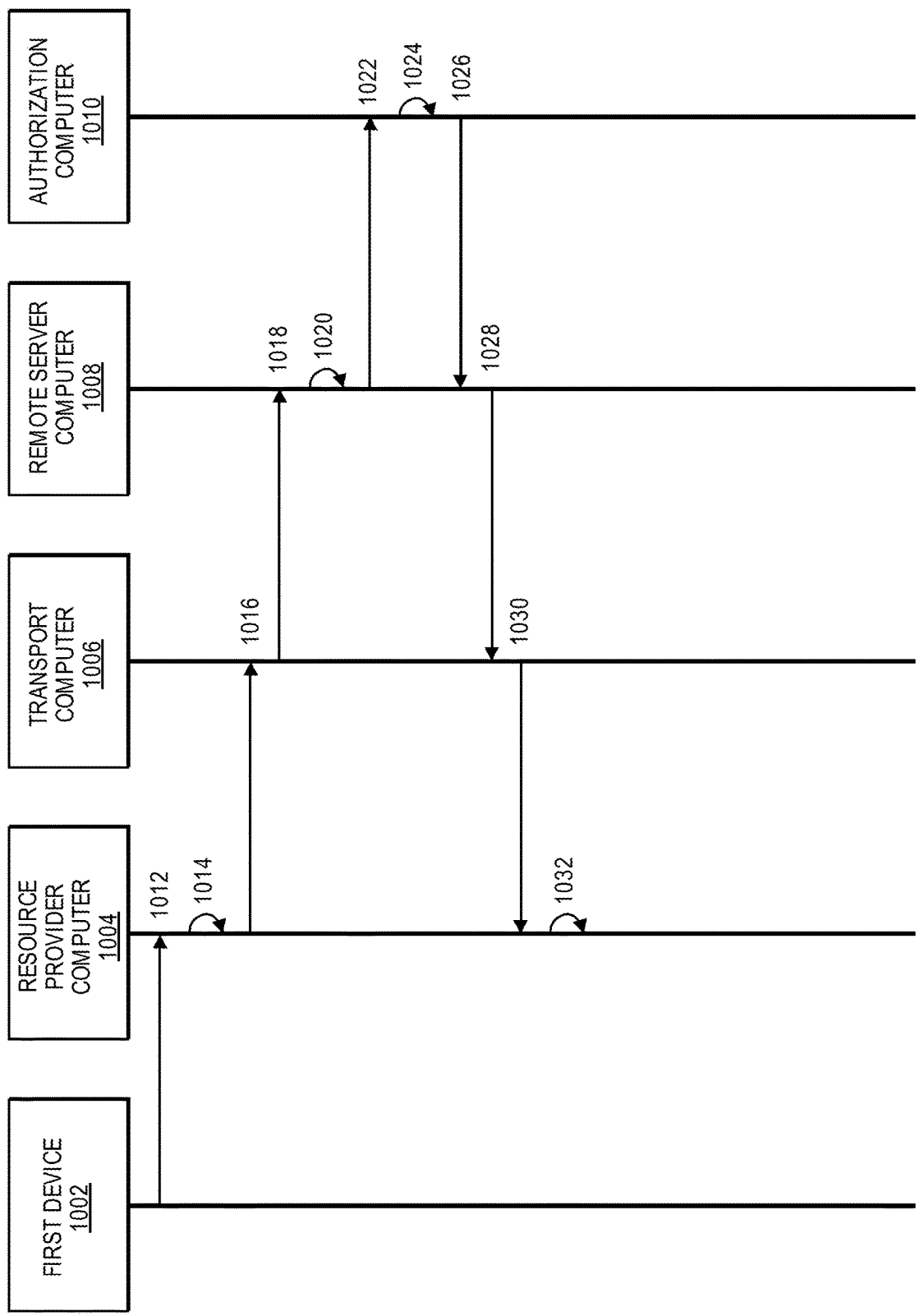
FIG. 10 shows a sequence diagram of an interaction conducted with a resource provider according to some embodiments.

FIG. 10 shows a sequence diagram of a method of conducting an interaction with a resource provider computer. The method of FIG. 10 may correspond to step 944 in FIG. 9.

At step 1012 first device 1002 can transmit a request to initiate an interaction between a resource provider associated with resource provider computer 1004 and a user associated with first device 1002. In some embodiments, the request to initiate the interaction is a request to initiate a transaction between the resource provider and a user associated with first device 1002. In some embodiments, the request to initiate the interaction can include a payment credential such as a PAN or tokenized PAN. Additionally, the request to initiate the interaction can comprise an electronic identifier, such as a user identifier associated with a user of first device 1002 or a device identifier of first device

1002. The electronic identifier may be used to identify an account or payment credential associated with the user of first device 1002.

At step 1014 resource provider computer 1004 can generate an authorization request message. The authorization request message can comprise a payment credential such as a PAN or tokenized PAN and interaction information. The interaction information can include information needed to conduct the interaction. For example, if the resource provider computer 1004 is associated with a water company, and the interaction comprises paying a water bill, the interaction information can comprise the cost of the water bill, the payment date, a device or user identifier, and a resource provider identifier. In some embodiments, the authorization request message may comply with any appropriate standards for systems that exchange electronic transaction information, such as ISO 8583.

At step 1016 resource provider computer 1004 can transmit the authorization request message to transport computer 1006. In some embodiments, transport computer 1006 may be an acquirer computer associated with resource provider computer 1004. For example, transport computer 1006 may be associated with an acquirer bank that manages an account on behalf of a resource provider associated with resource provider computer 1004.

At step 1018 transport computer 1006 can forward the authorization request message to remote server computer 1008 for further processing.

At step 1020 remote server computer 1008 can identify the authorization computer 1010 that should receive the authorization request message. In some cases, the remote server computer 1008 can determine the authorization computer based on one or more numbers or characters from a payment credential included in the authorization request message. The first six digits of a PAN for example, is a bank identification number or BIN. The BIN can be used to lookup the authorizing entity and corresponding authorization computer 1010.

At step 1022 remote server computer 1008 can transmit the authorization request message to authorization computer 1010. In some embodiments, authorization computer 1010 may be an issuer computer associated with an issuing entity. The issuing entity may be an issuing bank that manages an account on behalf of a user associated with the first device 1002.

At step 1024 authorization computer 1010 can evaluate the message and determine whether or not the user associated with first device 1002 is authorized to conduct the interaction. For example, in a transaction, the authorization computer 1010 may check to see if the account balance or available credit limit of the account associated with the primary access identifier is greater than a transaction amount in the authorization request message. The authorization computer 101 may also perform fraud checks or other transaction analysis.

At step 1026 authorization computer 1010 can generate and transmit an authorization response message to remote server computer 1008. The authorization response message may include a status indicator, such as approval or decline, as well as an authorization code that may serve as proof of authorization.

At step 1028 remote server computer 1008 can transmit the authorization response message to transport computer 1006.

At step 1030 transport computer 1006 can transmit the authorization response message back to resource provider computer 1004.

At step 1032 resource provider computer 1004 can complete the interaction. In some embodiments, this may involve initiating transfer of, or allowing access to a resource. For example, if the resource provider is an online merchant, and the resource is a good such as laundry detergent, the merchant may begin the process of shipping the good to the user of first device 1002.

In the case of transactional interactions, at the end of the day or at some other suitable time interval, a clearing and settlement process may be performed between the transport computer 1006 and authorization computer 1010.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   receiving, by a node in a network of nodes, operational data of nodes in the network of nodes, wherein the node stores a first blockchain and a second blockchain, and wherein the nodes in the network of nodes are IoT devices;
   writing, by the node, the received operational data and operational data of the node to the first blockchain;
   determining, by the node or another node in the network of nodes an action to be performed for the node or the another node;
   determining, by the node and using at least some of the operational data in the first blockchain, if the action to be performed is valid, by using a consensus algorithm to determine that the action to be performed is valid, wherein the consensus algorithm determines that the nodes in the network of nodes agree that the operational data is consistent with the action to be performed; and
   writing, by the node, data relating to the action to be performed on the second blockchain.

2. The method of claim 1, wherein the action to be performed comprises a payment transaction.

3. The method of claim 1, further comprising:
   receiving, by the node, a request from another node to read the operational data in the first blockchain; and
   transmitting, by the node, the requested operational data to the another node.

4. The method of claim 3, wherein determining, by the node and using the at least some of the operational data in the first blockchain, if the action to be performed is valid, is based on the requested operational data.

5. The method of claim 4, further comprising:
   receiving, by the node, from the another node, an instruction to write the data relating to the action to be performed on the second blockchain.

6. The method of claim 1, wherein the first blockchain and the second blockchain are stored in every node.

7. The method of claim 1, wherein the node is an endpoint node.

8. The method of claim 1, wherein determining, by the node and using the at least some of the operational data in the first blockchain, if the action to be performed is valid comprises determining, by the node if the operational data for at least two nodes in the network of nodes is inconsistent with the action to be performed.

9. The method of claim 1, wherein the network of nodes comprise a plurality of appliances, and wherein the data relating to the action to be performed is written to the second blockchain only if the action is determined to be valid.

10. The method of claim 9, wherein the operational data comprises communication data, use data, or energy consumption data related to the appliances.

11. A node in a network of nodes comprising:
    a processor; and
    a non-transitory computer readable medium coupled to the processor, the non-transitory computer readable medium comprising code executable by the processor for implementing a method comprising:
        receiving, by the node, operational data of nodes in the network of nodes, wherein the node stores a first blockchain and a second blockchain, and wherein the nodes in the network of nodes are IoT devices;
        writing, by the node, the received operational data and operational data of the node to the first blockchain;
        determining, by the node or another node in the network of nodes, an action to be performed for the node or the another node;
        determining, by the node and using at least some of the operational data in the first blockchain, if the action to be performed is valid, by using a consensus algorithm to determine that the action to be performed is valid, wherein the consensus algorithm determines that the nodes in the network of nodes agree that the operational data is consistent with the action to be performed; and
        writing, by the node, data relating to the action to be performed on the second blockchain.

12. The node of claim 11, wherein the action to be performed comprises a payment transaction.

13. The node of claim 11, wherein the method further comprises:
    receiving, by the node, a request from the another node to read the operational data in the first blockchain; and
    transmitting, by the node, the requested operational data to the another node.

14. The node of claim 13, wherein determining, by the node and using the at least some of the operational data in the first blockchain, if the action to be performed is valid is based on the requested operational data.

15. The node of claim 11, further comprising:
receiving, by the node, from the another node, an instruction to write the data relating to the action to be performed on the second blockchain.

16. The node of claim 11, wherein the first blockchain and the second blockchain are stored in every node.

17. The node of claim 11, wherein the node is an endpoint node, and wherein determining if the action to be performed is valid also uses actions on the second blockchain.

18. The node of claim 17, wherein determining, by the node and using the at least some of the operational data in the first blockchain, if the action to be performed is valid comprises determining, by the node if the operational data for at least two nodes in the network of nodes is inconsistent with the action to be performed.

19. The node claim 11, wherein the network of nodes comprise a plurality of appliances.

20. The node of claim 19, wherein the operational data comprises communication data, use data, or energy consumption data related to the plurality of appliances.

* * * * *